United States Patent [19]

Maltz

[11] 3,985,950

[45] Oct. 12, 1976

[54] CONNECTION BETWEEN COAXIAL CONDUCTOR PAIRS

[75] Inventor: Georg Maltz, Burgdorf, Germany

[73] Assignee: Kabel-und Metallwerke Gutehoffnungshutte Aktiengesellschaft, Hannover, Germany

[22] Filed: Jan. 30, 1975

[21] Appl. No.: 545,417

[30] Foreign Application Priority Data

Feb. 9, 1974 Germany ............................ 2406236

[52] U.S. Cl. .......................... 174/88 C; 174/DIG. 8; 228/154; 228/165; 339/275 R

[51] Int. Cl.[2] ...................... H02G 15/08; H01R 5/04

[58] Field of Search .................. 174/88 C, 89, 94 R, 174/84 R, 75 C, DIG. 8; 339/275 R, 275 T; 29/628; 228/154, 165, 168, 169

[56] References Cited

UNITED STATES PATENTS

| | | | |
|---|---|---|---|
| 1,293,871 | 2/1919 | Murray | 228/154 X |
| 2,133,448 | 10/1938 | Harley | 174/88 C X |
| 3,541,495 | 11/1970 | Ellis et al. | 174/DIG. 8 UX |
| 3,787,607 | 1/1974 | Schlafly | 174/92 X |
| 3,818,123 | 6/1974 | Maltz et al. | 174/84 R X |

FOREIGN PATENTS OR APPLICATIONS

| | | | |
|---|---|---|---|
| 412,835 | 7/1934 | United Kingdom | 339/275 T |

*Primary Examiner*—Laramie E. Askin
*Attorney, Agent, or Firm*—Ralf H. Siegemund

[57] ABSTRACT

The outer conductors of two coaxial pairs each is received by slotted axial ends of a sleeve, so that the respective fingers engage the outer conductors, and wherein annular solder on the fingers and in the slots holds the fingers on the conductors and provides bonded connections between the sleeve and the outer conductors. A heat shrunk hose is slipped over the sleeve holding it additionally to the outer conductors. The inner conductors of the pairs are conventionally interconnected.

2 Claims, 3 Drawing Figures

Fig. 1
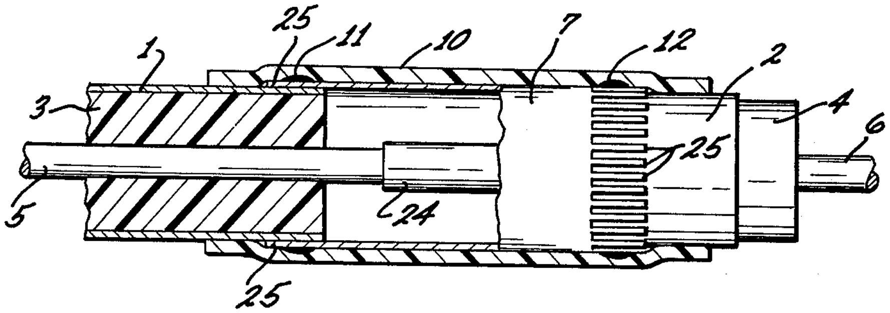
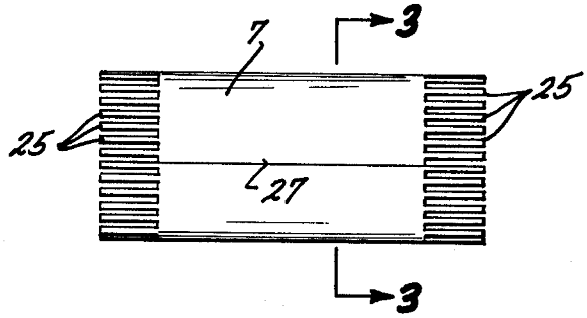
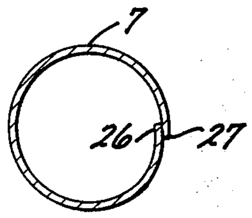
Fig. 2
Fig. 3

CONNECTION BETWEEN COAXIAL CONDUCTOR PAIRS

BACKGROUND OF THE INVENTION

The present invention relates to interconnecting of pairs of coaxial conductors. The conductor pairs serve, for example, as a transmission line in communication cables used for transmitting analog or digital information.

In U.S. Pat. No. 3,818,123 by me and others a connection between pairs of coaxial conductors is described, wherein the outer conductors are interconnected by means of a tube which is flush and aligned with the outer conductors and is soldered thereto at both ends. A hose has been shrunk over and onto the sleeve, the solder joints, and end portions of the outer conductors.

DESCRIPTION OF THE INVENTION

It is an object of the present invention to provide for a modified connection between a pair of coaxial conductors with emphasis on facilitating the making of the connection.

In accordance with the preferred embodiment of the present invention, it is suggested to retain the basic combination of elements, namely an electrically conductive connection sleeve for the outer conductors, a heat-shrunk hose and solder bonds. However, it is specifically suggested to provide the sleeve with fingers at both axial ends and with slots in between the fingers. Opposite ends of the sleeve are shifted onto the outer conductor ends, being gripped by the fingers, and solder is used to provide for bonding to the fingers as well as to the outer conductor portions as exposed through the slots between the fingers. The inner conductors are conventionally interconnected.

It can be seen that the sleeve ends assume radially yielding contour to obtain tight fit and abutment of the fingers on the outer conductors permitting considerable tolerances in the diameter relation. Also, no particular axial dimensions and spacings have to be observed or prepared except that the sleeve must be shifted for some (axial) distance over the ends of both outer conductors.

The solder bonds, being preferably annularly coherent, and both sleeve ends provide adequate mechanical and electrical connection as between the sleeve and both outer conductors, and, therefore, between the conductors themselves. Moreover, the abutment between the fingers and the outer conductors provides additional connection, reinforced particularly by the heat-shrunk hose on and around the entire assembly.

DESCRIPTION OF THE DRAWINGS

While the specification concludes with claims particularly pointing out and distinctly claiming the subject matter which is regarded as the invention, it is believed that the invention, the objects, and features of the invention and further objects, features, and advantages thereof will be better understood from the following description taken in connection with the accompanying drawings in which:

FIG. 1 is a somewhat schematic longitudinal section through the connection of two coaxial conductors;

FIG. 2 is a side view of a tubular sleeve that can be used in the connection shown in FIG. 1; and FIG. 3 is a section view along lines 3—3 in FIG. 2.

Proceeding now to the detailed description of the drawings, FIG. 1 shows two coaxial conductors wherein 1 and 2 denote the respective outer conductors, and 5, 6 are respectively the two inner conductors. The inner conductors are held by and support the respective outer conductors by means of spacers 3 and 4.

The inner conductors 5 and 6 are interconnected in a suitable manner; they are, for example, received in opposite ends of a connection sleeve 24, keyed thereto or held by means of friction or by means of soldering, brazing or the like. The specific connection here is not of immediate importance and made in a conventional manner, such as shown in the above identified U.S. Pat. No. 3,818,123.

The outer conductors are interconnected by means of a metal sleeve 7 having axial slots at both ends to define fingers 25, which extend axially and in parallel relation to each other. The sleeve 7 is placed onto the two ends of the two outer conductors 1 and 2, so that particularly the fingers grip the outer conductors. A shrinkable (and shrunk) hose 10 is situated on top and about sleeve 7. The hose 10 is longer than the sleeve 7, so that the end portions of hose 10 abut directly adjacent portions of the conductors 1 and 2 and fit particularly snugly to the ends of the fingers 25.

The hose 10 contained solder rings which have been heated to melt so as to obtain the annular solder connections 11 and 12. The annular solder bonds are coherent and are respectively bonded to the fingers 25. Upon heating softened solder seaped into the slots between the fingers 25 and has been bonded also to the portions of the conductors 1 and 2 as exposed through the slots. This way the sleeve 7 has been soldered to the outer conductors 1 and 2.

It can thus be seen that the coherent annular solder bonds provide for mechanical as well as electrical connections between sleeve (fingers) and the outer conductors (1, 2) underneath. Moreover, the fingers 25 engage the outer conductors themselves and make electrical contacts therewith.

If the sleeve is slightly too small, the fingers will spread a little radially and serve additionally as clamps which enhances contact making as well as mechanical stability. Both contact making and mechanical strength are further enhanced by the shrunk hose. Particularly with regard to the holding action by the hose, it should be mentioned that even if the sleeve is a little too large, the fingers 25 can be bent slightly inwardly and are held additionally by the shrunk hose.

The connection between the two coaxial conductors — 1,5 and 2,6 — can be accomplished as follows. At first, in the outer conductors 1,2 are cut in relation to the inner conductors (or vice versa), so that the latter project sufficiently for interconnection by the sleeve or socket element 34, while the outer conductors are axially spaced at a distance shorter than the length of the connection sleeve 7 intended to be used. The inner conductors 24 are, however, not yet interconnected.

Next, sleeve 7 is slipped onto one of the outer conductors, and hose 10 (still rather wide) is slipped over sleeve 7, so that the one included solder ring becomes situated adjacent the fingers at that one sleeve end. Since the hose is flexible, it can be slipped onto the sleeve completely and bunched slightly, so that the other hose end does not interfere with the subsequent insertion of the other; outer conductor into the sleeve and from the other end.

Next, the two inner conductors can be interconnected and sleeve 7 is slipped over the respective other, outer conductor. Flexible hose 10 is now straightened and slipped to some extent over this other sleeve end and the respective inserted outer conductor. The respective second solder ring is situated subsequently adjacent the fingers and slots at that other sleeve end.

Finally, heat is applied to hose 10, so that it shrinks, and the solder is caused to melt. The solder will droop into the slots and adhere to the outer conductor surface portions as exposed by the slots between the fingers. The solder will not lose its coherency, so that in fact a closed annular solder connection is obtained between the solder itself, the fingers 25 and the respective outer conductor.

The connecting process has been described with reference to a completed sleeve 7. However, if the final sleeve has resulted from forming a sheet into a sleeve (FIGS. 2, 3) that bending operation may well be carried out in situ.

In this case, hose 10 is first slipped rather loosely onto one of the outer conductors. Next, the inner conductors are interconnected, whereupon a sheet with end fingers is wrapped around both outer conductors to form the sleeve 7 thereon. The sheet edges 26, 27 will overlap and may be interconnected in any suitable fashion, but actually that connection may consist only of a very temporary kind of bond or may not even be needed at all, because the sleeve will subsequently be held to the contour of the conductors by the slipped over hose.

The method of forming the sleeve 7 in situ has the advantage that any diameter difference of the outer conductors is compensated right then and there. Also one does not need different kinds of connector sleeves for different kinds and sizes of conductors.

The invention is not limited to the embodiments described above, but all changes and modifications thereof not constituting departures from the spirit and scope of the invention are intended to be included.

I claim:

1. In a connection between two coaxial conductors, each having an inner and an outer conductor with spacers in between, and wherein means are provided for interconnecting the inner conductors, the improvement comprising

- a sleeve having axially extending fingers with slots in between and at both ends of the sleeve, the end portions with fingers being respectively slipped over the outer conductors for gripping engagement thereof by the fingers;
- two annular solder bonds at both sleeve ends bonded to the fingers and to the respective outer conductor portions as exposed through the slots between the fingers; and
- a shrunk hose on the sleeve and overlapping the two outer conductors to hold the sleeve additionally on the conductors.

2. A connection as in claim 1, the sleeve being a tubularly wrapped sheet with overlapping edge.

* * * * *